COMMUNICATION SYSTEM FOR SHIELDED AREAS

Filed Dec. 1, 1961 3 Sheets-Sheet 1

INVENTOR.
CLYDE V. HUSSEY
BY
Mason, Kolehmainen, Rathburn and Wyss
ATTORNEYS

June 22, 1965 C. V. HUSSEY 3,191,122

COMMUNICATION SYSTEM FOR SHIELDED AREAS

Filed Dec. 1, 1961 3 Sheets-Sheet 2

INVENTOR.
CLYDE V. HUSSEY
BY Mason, Kolehmainen, Rathburn and Wyss.
ATTORNEYS

COMMUNICATION SYSTEM FOR SHIELDED AREAS

Filed Dec. 1, 1961 3 Sheets-Sheet 3

INVENTOR.
CLYDE V. HUSSEY
BY Mason, Kolehmainen, Rathburn and Wyss
ATTORNEYS

United States Patent Office 3,191,122
Patented June 22, 1965

3,191,122

COMMUNICATION SYSTEM FOR SHIELDED AREAS

Clyde V. Hussey, Tulsa, Okla., assignor to Seismograph Service Corporation, Tulsa, Okla., a corporation of Delaware Filed Dec. 1, 1961, Ser. No. 156,351
16 Claims. (Cl. 325—54)

This invention relates generally to communication systems and more particularly to short range, wireless systems for use in providing two-way communication between areas which are so shielded from each other that direct radio communication cannot be achieved.

It is often desirable to be able to provide two-way communication between different areas electrically shielded from one another in such manner that it is impossible to transmit and receive direct radio waves therebetween. This problem arises, for example, in operations taking place around the launching site for a rocket or missile where it is desired to be able to provide two-way communication between a remote control center and one or more work stations which may be located at various underground or surface positions around the missile launching silo. It should be understood that the present invention is not limited to use in missile launching site communications but, since the latter environment provides a particularly suitable background for description of the problems existing and the unique solutions afforded by the invention, the ensuing description will concern itself primarily with use of the apparatus of the present invention at a missile launching site.

Prior to the present invention it was proposed that two-way communication could be maintained between the electrically shielded areas existing around a missile launching site by the use of a standard wire telephone system. However, since the equipment provided at various working sites must be portable in nature so that it can be carried by an operator performing work operations on the missile, the use of a telephone system would involve the use of wires extending through the work area of the missile launching site, a solution which is highly undesirable due to the fact that these wires interfere with the movement of personnel and create obstacles which may inhibit the proper performance of the work being conducted. In addition, the initial equipment cost and the time and cost involved in installation are much greater for a wired telephone system than for a comparable radio communication system. However, initial attempts to provide radio communication between the different areas in the vicinity of the launching site proved unsuccessful for several reasons. First, the missile tracking equipment and other electronic apparatus used in the vicinity of the missile launching site produce high ambient RF signals interfering with reliable radio communication. In addition, high acoustic noise levels existing at the site, signal cancellation arising from reflection from the various reflecting structures in the vicinity of the site, and severe signal attenuation in certain areas introduced additional problems. Perhaps the most important single reason for the initial failure of radio communication equipment, however, was introduced by the high degree of shielding between the various working areas in the vicinity of the missile launching site so that direct transmission and reception of radio waves from one working area to another was impossible. The present invention, therefore, has for its principal object the provision of a new and improved radio communication system which avoids all of the problems discussed above.

A more specific object of the invention is to provide a new and improved radio communication system for providing two-way communication between the areas which are electrically isolated or shielded from one another in such manner that direct transmission and reception of signals between the two stations would ordinarily be impossible.

A further object of the invention is to provide a radio communication system of the character described which permits the use of low power radio transmission while at the same time providing effective reception of signals throughout the areas being covered by the system.

Another object of the invention is to provide a radio communication system avoiding the development of weak signal strength regions without, at the same time, requiring high power from the transmitters, thus avoiding interference with other equipment operating in the same general area.

The invention has for a further object the provision of a radio communication system characterized by low power output to minimize interference problems to conserve the frequency spectrum and also to minimize the transmitter power requirements without, at the same time, impairing the effective reception of signals within the areas being covered.

The foregoing and other objects are realized in accordance with the present invention by providing a radio communication system having a master or relay station and a plurality of remote units which are preferably portable and which may be located in areas electrically shielded from one another and/or from the relay station. The relay station includes a crystal controlled transmitter operating on a frequency $F_1$ and a receiver tuned to receive signals in a second frequency channel $F_2$ and having sufficient selectivity to reject signals in the vicinity of the frequency $F_1$. The output of the receiver is normally connected through a push-to-talk switch to a modulator in the transmitting section of the relay station. The remote units or portable stations may be identical in construction and each comprises a crystal controlled transmitter developing signals in the second frequency channel $F_2$ together with a receiver which is tuned to receive signals in the vicinity of the frequency $F_1$ but is sufficiently selective to reject those signals having a frequency $F_2$. The input of the receiver at the remote unit is connected to an antenna through a switch which is either manually or voice operated to connect the antenna to the transmitter when the operator at the remote unit desires to communicate either with the relay station or with one or more of the other remote units. The signal directly transmitted from each remote unit obviously cannot be received at the other remote units but two-way communication from one remote unit to another may be effected by using the relay station as a link, that is, by transmitting a signal having a frequency $F_2$ from the remote unit, which signal is modulated by voice signals developed by a microphone at the remote unit. The latter modulated signal is received by the receiver at the relay station where the signal is demodulated and the detected output is passed to a loud speaker or earphones and is also modulated upon the signal of frequency $F_1$ radiated from the relay station. The latter signal is, of course, received by the other remote units. The operator at the relay station can break the link at any time by stopping the reradiation of the detected signal received from the remote unit, whereupon this operator can communicate with the remote units by voice signals modulated upon the transmitter frequency $F_1$. The latter modulated signal may be received at all of the remote units where the receiver demodulates the signal and passes the resultant audio output to a set of earphones or a loud speaker.

In accordance with an important feature of the present invention, the communication between the electrically shielded areas where the different remote units and the relay station may be located is made possible by stringing a cable or electrical conductor from the fixed relay station to the different areas between which communication is to be maintained. The cable or conductor is not connected to the remote units but, instead, passes through the shielded areas where the remote units are located and the cable is disposed at a position where it will not interfere with the work being performed. In each of the shielded areas at least one short stub antenna is electrically connected to the cable or conductor and each such antenna is effective to transmit signals developed at the relay station and to receive signals from any remote unit operating within the area in which this antenna is located. The stub antennas are so spaced that all regions are capable of receiving and transmitting signals from or to the relay station and this is accomplished without using high power transmitters. Thus, the stub antennas and the cable or conductor connected to the relay station cooperate to permit effective communication between all areas of the system despite electrical shielding between these areas which would ordinarily make such communication impossible.

The invention, both as to its organization and manner of operation, together with further objects and advantages will best be understood by reference to the following detailed description taken in conjunction with the accompanying drawings wherein.

Figures 1, 2:
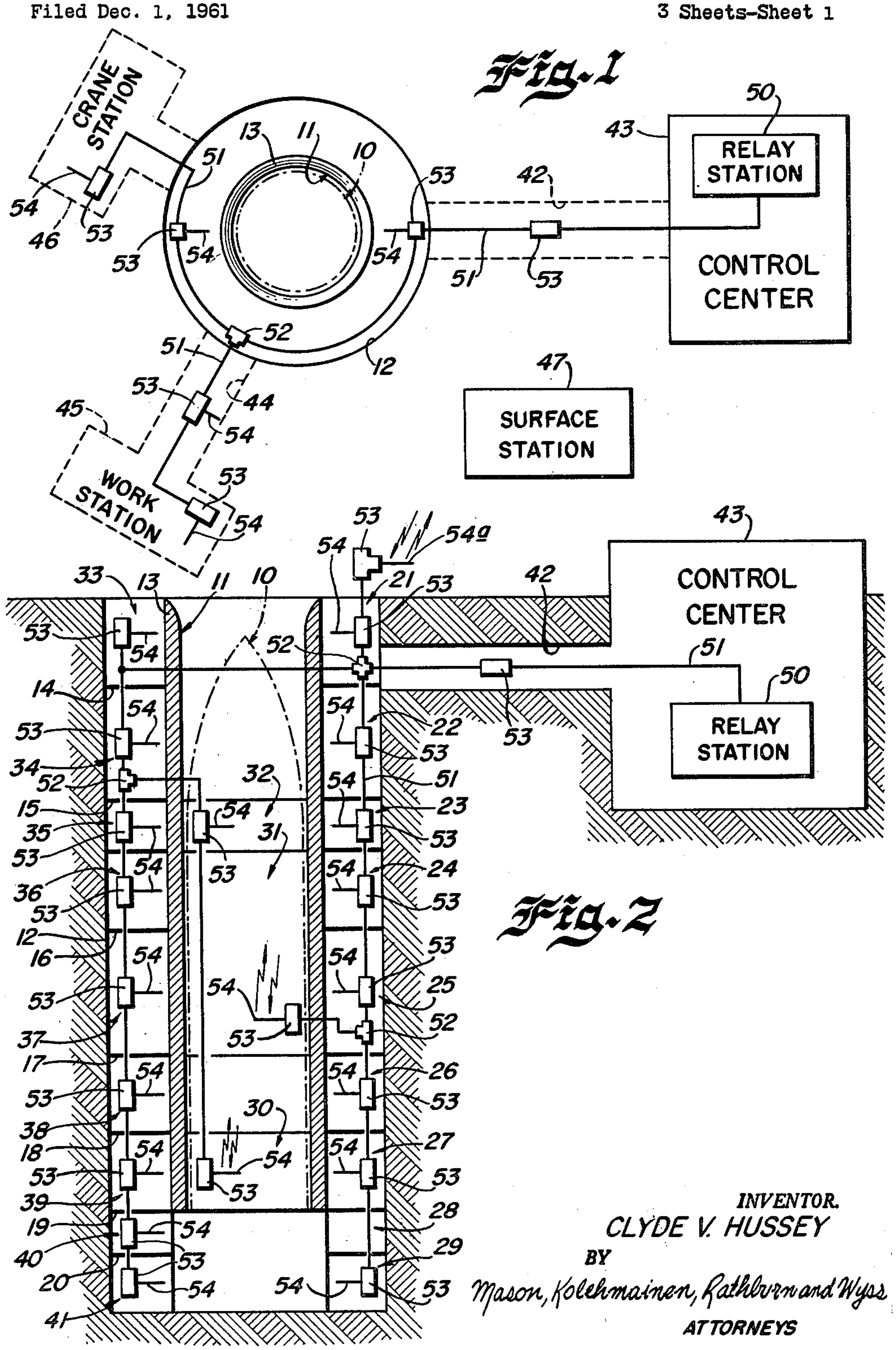
FIG. 1 is a somewhat schematic, plan view of a missile launching site including various work stations, a central control station and a surface station between which two way radio communication is desired.
FIG. 2 is a somewhat schematic, elevational view taken through a portion of the earth's surface and showing the underground missile launching site and the control center.

Referring now to the drawings and first to FIGS. 1 and 2 thereof, a very simplified schematic version of a typical missile or rocket launching site is there shown. The missile or rocket is shown in broken lines and is identified by the reference numeral 10. This missile is shown in launching position within a launching structure known as silo and indicated generally by the reference numeral 11 in FIG. 1. The silo inserted within a hole 12 formed in the earth's surface and extending downwardly therefrom for a distance sufficient to permit insertion of the missile or rocket 10. The silo includes a metallic supporting frame structure 13 carrying a number of vertically spaced apart work platforms identified by the reference numerals 14 to 20, inclusive. These platforms cooperate with the frame structure 13 and with the walls around the hole 12 to define work areas within which various operations are to be performed on the missile 10 prior to launching. These operations may include, of course, testing and calibrating the various electronic equipment, testing the various firing circuits, fuel checking, and the like. The different work areas within the missile launching silo are respectively designated by the reference numerals 21 to 41, inclusive, the particular number used being of no consequence insofar as the present invention is concerned.

The missile launching silo is also illustrated as being connected through a tunnel 42 to a control center housing 43 which may be partially underground as is illustrated in FIG. 2. The missile launching silo may also be connected through various other tunnels such as the tunnel 44 shown in FIG. 1 to different remote work stations such as the work station 45. There may also be provided adjacent the missile launching silo a crane station indicated in FIG. 1 by the reference numeral 46 where the crane mechanism is positioned for lowering the missile 10 into position within the silo and for raising the missile in the event of a malfunction which necessitates its removal without launching. In addition, there may also be provided one or more surface stations located above ground as represented by the surface station 47 shown in FIG. 1.

As was previously indicated, it is desirable to be able to maintain two-way radio communication between personnel or operators respectively located at the control center 42, the various work stations 45, the crane station 46, the various surface stations 47, the interconnecting tunnels between the underground stations and the various operating stations 21 to 41 located within the silo 11. The shielding provided by the various metallic structures forming the frame 13 and the platforms 14 to 20 in the silo together with the shielding effect of the subterranean earth formations prevent direct transmission and reception of waves betwen the various stations illustrated. To permit two-way communication between these stations, there is provided, in accordance with the present invention, a fixed relay station or master station 50 located within the control center housing 43 and connected via a cable or conductor means 51 extending through the tunnel 42 to the missile launching silo 11 where various branch cables or conductors are provided extending within the operating sites 21 to 41 and also extending through the tunnel 44 to the various work stations 45 and to the crane station 46. The conductor 51 is preferably a coaxial cable having an outer shield grounded to the casing for the equipment making up the relay station 50. The particular manner in which the cable is strung through the various tunnels, work stations and operating stations is of no consequence but preferably this cable and its branches are located at positions where they do not interfere with the work being carried out at the particular station involved and, to this end, they may be located adjacent the ceiling or along one wall of the station. Suitable cable connectors 52 may be provided to facilitate connection of the various branch conductors to the main cable 51. The cable is preferably of a relatively low loss type and may be terminated in its characteristic impedance.

In accordance with a very important feature of the present invention the cable 51 and its various branch conductors are also electrically connected through suitable connectors 53 to a plurality of relatively small emitting and receiving stub antennas 54, there being at least one such antenna within each of the shielded areas between which radio communication is desired. To provide the desired two-way radio communication between the relay station 50 and the different operators located in the work areas 21 to 41 of the silo, the work station 45, the crane station 46 and the surface station 47, there are provided remote transmitting and receiving units indicated in FIG. 3 by the reference numeral 55. These remote units may be in the form of portable equipment carried by the personnel working within the various stations.

Figure 3:
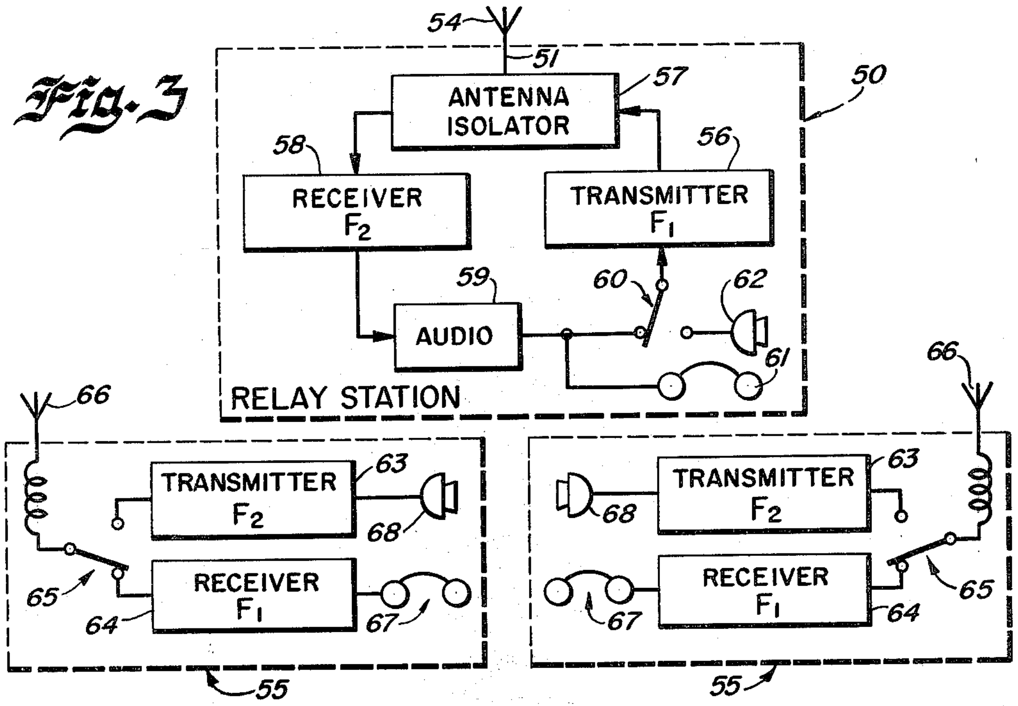
FIG. 3 is a partially diagrammatic, partially schematic view illustrating a relay station and a pair of remote units which may be used to provide two-way communication between the various stations shown in FIGS. 1 and 2.
Figure 5:
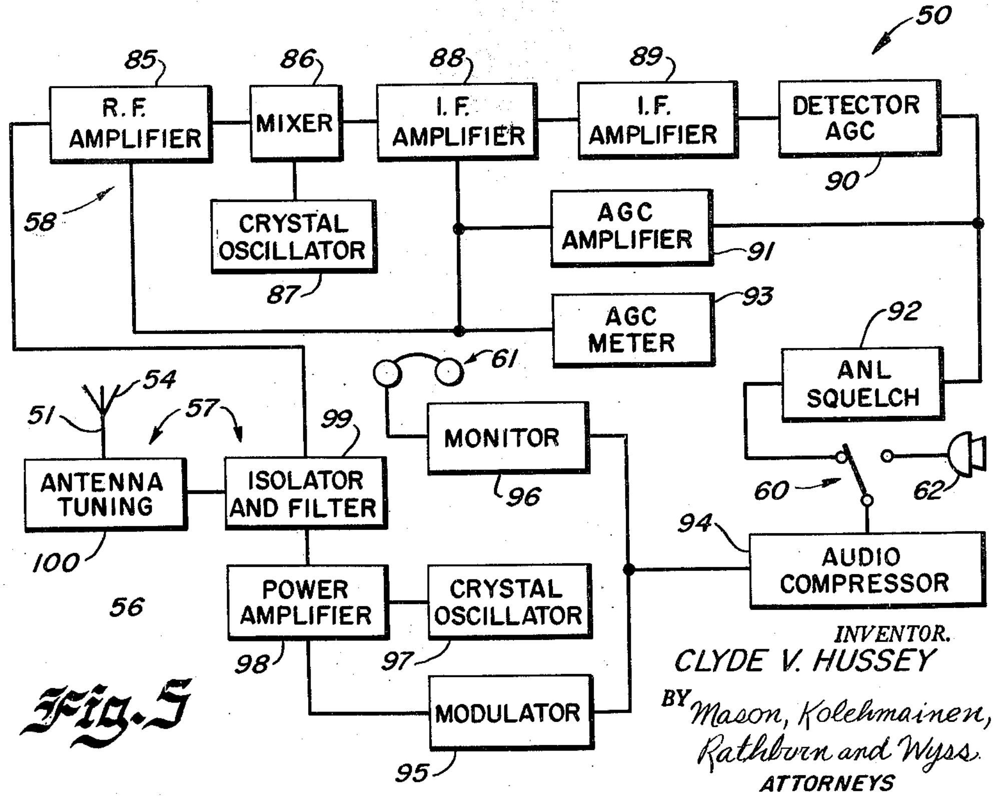
FIG. 5 is a block diagram, partially schematic showing a relay station which may be used in the system shown in FIG. 3.
Figure 4:
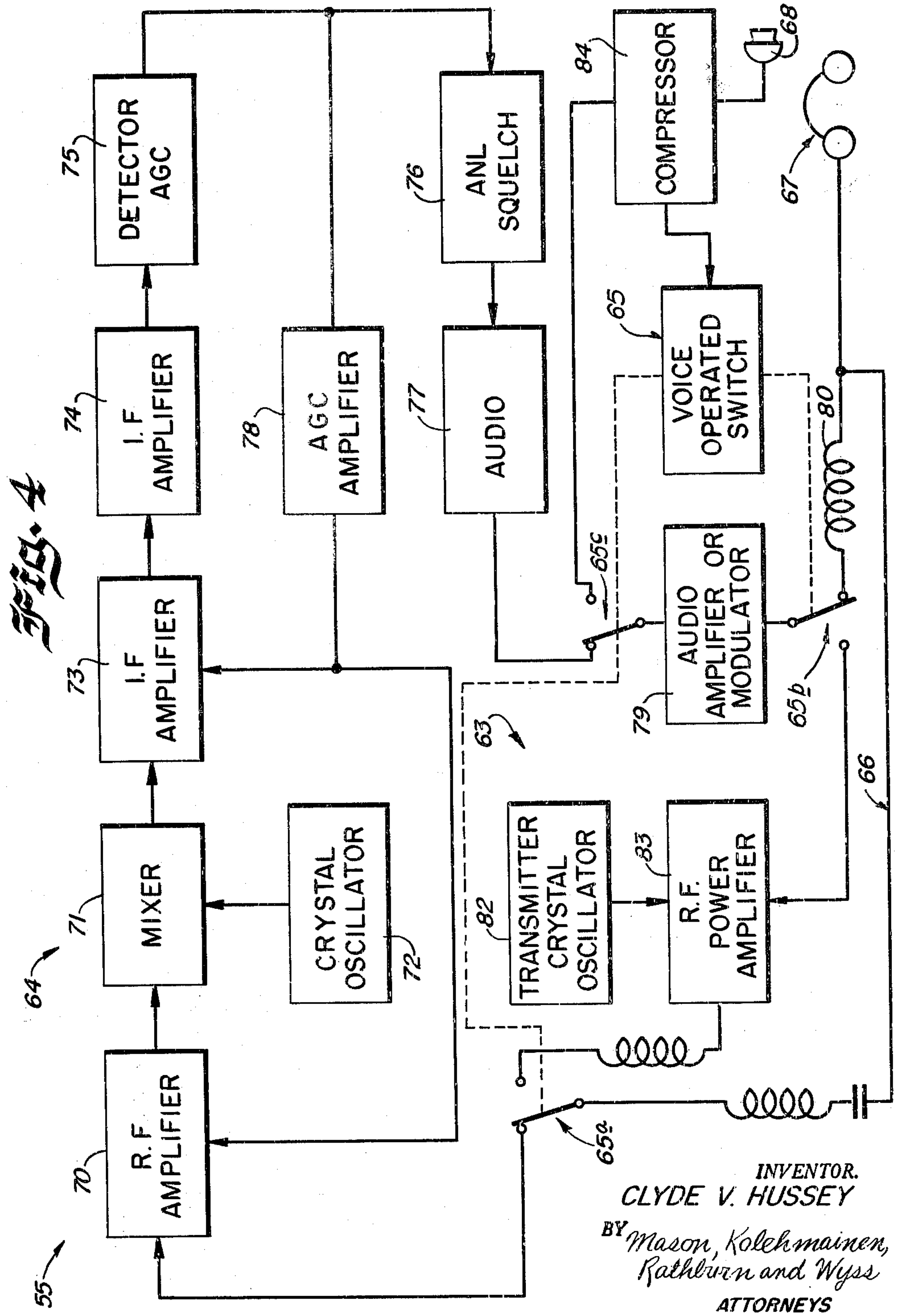
FIG. 4 is a block diagram, partially schematic showing a remote unit or portable transceiver which may be used in the system shown in FIG. 3.

The communication system illustrated in FIGS. 3, 4 and 5 of the drawings provides for transmission and reception of signals from the relay station 50 to each of the remote units 55 to effect two-way radio communication therebetween. Communication between the various individual remote units is also made possible by using the relay station as a re-radiating receiving and transmiting link. To accomplish these results, the relay station 50, as is shown in FIG. 3 of the drawings, comprises a crystal controlled transmitter for developing a carrier wave signal having a frequency $F_1$ which signal is applied through an antenna isolator circuit 57 and through the cable 51 to the various transmitting and receiving sub-antennas 54. The relay station 50 further comprises a single conversion superheterodyne receiver 58 having its RF circuits tuned to receive signals within a second frequency channel $F_2$ which is separated sufficiently from the first frequency $F_1$ to permit reliable reception of signals in the channel $F_2$ without at the same time receiving signals in the vicinity of the frequency $F_1$. The antenna isolator circuit 57 provides the necessary isolation between the transmitted signals of frequency $F_1$ and the received signals in the channel $F_2$. The output of the receiver 58 is passed through an audio section 59 to a conventional push-to-talk switch 60 which in the normal or "rebroadcast" position illustrated in FIG. 3 supplies these output signals to the transmitter 56 where they are amplitude modulated upon the carrier wave signal of frequency $F_1$. The output of the audio section 59 is also delivered to a suitable audible signal producing means such as a loudspeaker or headset 61 including a pair of earphones. When the push-to-talk switch 60 is depressed by the operator at the relay station, the modulator of the transmitter 56 functions to modulate the carrier wave signal $F_1$ with audio voice signals supplied from a microphone 62. The modulated signals from the relay station are emitted from all of the antennas 54 distributed around the various areas in the vicinity of the missile launching site.

The remote units 55 may be of identical construction and each comprises a crystal controlled transmitter developing a carrier wave signal having a frequency $F_2$ together with a receiver 64 having its RF circuits tuned to receive signals in the vicinity of the frequency $F_1$. These RF circuits are, of course, sufficiently selective to reject signals in the channel $F_2$. The input or RF circuits of the receiver are normally connected through section 65*a* of a conventional voice operated switch 65 to a radiating and receiving antenna 66 which may for example be located within or upon a helmet or harness worn by the operator at the remote station. The receiver 64 detects the audio voice signals modulated in the carrier wave received from the relay station and delivers these audio signals to a conventional headset 67 including a pair of earphones so that the operator can hear the detected voice signals. Since the receiver 64 is incapable of accepting the signals transmitted from the other remote units in the system, communication with these other units can be established only by using the relay station as a link unit in a manner described more fully below. If the operator at the remote unit desires to communicate either with the relay station 50 or with the other remote units in the system, he speaks into a microphone 68 whereupon the switch 65 is automatically operated so that its switch section 65*a* immediately connects the output of the transmitter 63 to the antenna 66. The voice signals from the microphone 68 are amplitude modulated upon the carrier wave signals developed by the transmitter 63 and the resulting modulated signals are received by the antenna 54 located within the particular work area where the remote unit is located. These signals then pass through the cable 51 and through the antenna isolator circuit 57 at the relay station to the input of the receiver 58 which functions in conventional manner to demodulate the audio voice signals and pass them through the audio section 59 to the headset 61. If the operator at the relay station 50 desires to communicate to the remote unit he presses the switch 60 and speaks into the microphone 62 whereupon the resultant audio signals are modulated upon the signal developed by the transmitter 56 and are passed through the antenna isolator circuit 57 and through the cable 51 to the radiating and receiving antennas 54 at each of the remote areas. These signals are then received by the antenna 66 of each remote unit and are passed through the switch 65 for detection by the receiver 64 to develop audio voice signals for application to the headset 67. In this manner communication is possible in either direction between the relay station 50 and each of the remote units 55. When the operator of one of the remote units desires to communicate with another remote unit he speaks into the microphone 68 and energizes the switch 65 in the manner described above so that the modulated signal output of this transmitter 63 is radiated from the antenna 66 to the antenna 54 in this area. The signals are then passed through the cable 51 to the receiver 58 which demodulates the received signals and passes the resultant audio voice signal through the audio section 59 and through the deenergized push-to-talk switch 60 to the modulator circuit of the transmitter 56. The modulated carrier wave output from the transmitter 56 is passed through the cable 51 for radiation from each of the antennas 54 in the remote areas. The carrier wave emanating from all of the antennas 54 at the various remote stations is detected by the receivers 64 of all of the remote units 55 which do not have their voice operated switches 65 in the transmitting position with the result that the detected audio signals are applied to the headsets 67 of all such remote units to permit reception of the voice signals from the transmitting remote unit. Obviously, communication can be effected between the individual remote units in both directions by using the station 50 as a link or relay station in the manner described. The use of voice operated switches at the remote units permits communication without requiring use of the hands by the operator and, as a result, he is able to perform all of his normal tasks or functions. This feature provides the system of the present invention with all of the advantages of the ordinary voice powered wired systems but, in addition, the system of the present invention provides the additional advantage of permitting complete freedom of movement of the operator.

There are several factors which must be considered in the selection of the operating frequencies $F_1$ and $F_2$ for the system. These frequencies should be low enough to overcome the limitations of line of sight communication, and to permit use of reliable, economical and readily available semiconductors both at the relay station 50 and at the portable units 55, while at the same time these frequencies must be high enough to allow use of relatively small components with the resulting economy both in weight and space and the frequencies should also be high enough to minimize the possibilities of interference to reception from outside sources. In addition, the frequencies should be high enough to permit a relatively high degree of antenna efficiency without requiring the use of unduly long antennas protruding into the operating areas. Finally, frequencies should preferably be selected which are compatible with requirements of the Federal Communications Commission of the U.S. Government. In view of all of these considerations, frequencies in the range between 20 and 50 megacycles are preferable and frequencies between 30 and 50 megacycles have been found to be highly desirable. The power output from the transmitter is selected to provide the desired range so that reliable signal reception can be attained within all of the areas of the system. Excessive power from the transmitters increases the possibility of interference of the radiated signals with other equipment which may be located at or near the launching site and it also requires heavier power supplies to be carried by the operators of the remote units. Moreover, to conserve the frequency spectrum the transmitting power should be as low as possible in order to avoid radiation beyond the areas to be covered without adversely affecting signal reception within any of the regions in this area. RF power output in the vicinity of 20 to 100 milliwatts from the transmitters at both the relay station 50 and the remote units 55 has been found to fulfill these requirements. Amplitude modulation is used in preference to frequency modulation in view of the fact that AM equipment is basically simpler than equivalent FM equipment and, for this reason, is more economical.

Turning now to the equipment provided at the remote unit or portable transceiver 55 and referring particularly to FIG. 4 of the drawings, it will be observed that the receiver 64 is a crystal controlled single conversion superheterodyne receiver having provisions for both automatic gain control and a self-adjusting, noise limiter with a manually operated preset squelch control. More specifically, the receiver 64 comprises an RF amplifier section 70 which, as was previously indicated, is tuned to receive signals in the vicinity of the frequency $F_1$ and is sufficiently selective to reject signals in the vicinity of the frequency $F_2$. The output of the RF amplifier section 70 is applied to a conventional mixer circuit 71 which is also supplied with local oscillator signals derived as a third overture from a crystal controlled local oscillator 72. The power output from the local oscillator is very low to minimize radiation. The mixer of course beats the received signals from the RF amplifier section 70 with the output of the local oscillator 72 to produce the sum and difference frequencies and the difference frequency of 455 kilocycles is passed through a tuned circuit to two stages of IF amplifications respectively identified by the reference numerals 73 and 74. The output of the second IF amplifier stage is supplied to a biased diode type detector and automatic gain control circuit 75 which functions to detect the audio signals modulated on the input signals supplied to the RF amplifier 70 and to supply these detected signals through an automatic noise limiter and squelch control circuit 76 to an audio amplifier 77. The circuit 75 also develops an automatic gain control signal which is passed through an automatic gain control amplifier 78 to control the gain of the RF amplifier 70 and the first IF amplifier stage 73. The output of the audio amplifier section 77 is applied through a section *65c* of the voice operated switch 65 to a circuit 79 which is capable of acting either as an audio amplifier or as a modulator. When the remote unit 55 is operating as a receiver, the circuit 79 acts as an audio amplifier to apply output signals through another section *65b* of the voice operated switch 65 and through an isolating coil 80 to the headset 67 so that the incoming voice signals arriving either from the relay station 50 or from another remote unit can be heard by the operator. The input signals arriving at the receiving antenna 66 are link coupled to the RF amplifier 70 through the section *65a* of the voice operated switch 65 which is normally in the receiving position illustrated in FIG. 4. The receiving antenna may take the form of a loop antenna wound into a relatively flat loop inserted into a helmet worn by the operator or in the alternative this antenna may take the form of a receiving and radiating pole carried either on the helmet or on a harness strapped to the operator's body. In addition, the cables used to connect the microphone and earphone of the operator's headset to the radio unit may be loaded to perform the function of the receiving and radiating antenna 66.

The transmitter 63 of the remote unit 55 comprises a crystal controlled oscillator 82 preferably tuned slightly inductive for purposes of stability and developing a fundamental frequency $F_2$ which is passed to an RF power amplifier 83. When the operator of the remote unit desires to transmit he speaks into the microphone 68 which has its output connected to a conventional compressor-expander circuit 84 for effectively limiting the amplitude variation of the audio signals. The circuit 84 also supplies a control signal to the voice operated switch circuit 65 so that the three sections *65a, 65b* and *65c* of the latter switch are automatically moved from the positions shown in FIG. 4 when the operator is speaking, thus connecting the output of the power amplifier 83 to the antenna 66, connecting the output of the compressor 84 to the circuit 79 and also connecting the output of the circuit 79 to the input of the RF power amplifier 83. With the switch 65 thus operated, the circuit 79 functions as an amplitude modulator with the modulation being accomplished by a class B transistor amplifier having restricted frequency response. The modulator, of course, functions in the usual manner to amplitude modulate the carrier wave signal developed by the oscillator 82 and the resulting modulated carrier wave is applied through the activated voice controlled switch 65 to the antenna 66 for radiation within the operating area where the particular portable unit 55 is located. The compressor 84 functions to maintain the modulation of the output from the portable unit nearly constant and at a high level in the order of ninety percent despite relatively large variations in the audio input signal. With the described circuit arrangement only two externally accessible controls are necessary for operation of the remote unit 55, these being a volume control (not shown) and an on-off switch for supplying power to the circuits of the portable unit from one or more batteries carried by the operator. The circuits illustrated in FIG. 4 employ transistors in order to realize all of the well known advantages with respect to economy of space and weight, low power consumption, etc.

Referring next to FIG. 5 for a consideration of the equipment employed at the relay station 70, it should be observed that the receiver 58 there shown is very similar to the receiver 64 employed at the portable unit in that it includes an RF amplifier section 85, a mixer section 86, a crystal controlled local oscillator 87, two stages of IF amplification 88 and 89 for amplifying the IF frequency of 455 kilocycles, a biased diode type detector AGC circuit 90, an AGC amplifier 91 and an automatic noise limiter and carrier operated squelch circuit 92. In addition, there is provided an automatic gain control meter 93 connected in the automatic gain control feedback circuit to provide means for continuously monitoring the AGC signal. With the push-to-talk switch 60 in the receiving position shown in FIG. 5, the output of the automatic noise limiter portion of the circuit 92 is applied through an audio compressor circuit 94 to an amplitude modulator 95 and to a monitor circuit 96 which feeds output signals to the headset or loud speaker 61. Thus, the operator at the control center relay station 50 is able to hear any voice signals arriving from the remote units 55.

The detected voice signals applied to the modulator 95 with the switch 60 in the receive position are modulated upon the carrier wave developed by the transmitter 56. The latter transmitter comprises a crystal controlled inductively tuned oscillator 97 which develops a fundamental RF signal of frequency $F_1$ for application through a power amplifier 98 to the antenna isolator circuit 57, consisting of an isolator and filter 99 and an antenna tuning section 100. Isolation between the signals transmited and received is necessary due to the fact that both the receiver and the transmitter at the relay station are operating simultaneously. Thus, the RF signal path between the output of the transmitter 56 and the input of the receiver 58 must provide a high degree of attenuation to the transmitter signal so as to prevent feedback of the relay station transmitter frequency and also to prevent blocking or desensitizing of the receiver 58. The modulator 95 functions to amplitude modulate the carrier wave of frequency $F_1$ developed by the oscillator 97 so that the signal radiated from the relay station with the push-to-talk switch 60 in the received position shown carries any voice signal detected from the remote units. The operator at the relay station may break the automatic relay link between the remote units at any time by depressing the push-to-talk switch switch 60 thus breaking the connection from the output of the automatic noise limiter squelch circuit 92 to the audio compressor 94. The operator at the relay station may sent a desired voice message to all of the portable units by speaking into the microphone 62 to develop audio signals which are passed through the compressor 94 and are amplitude modulated upon the output of the crystal oscillator 97 by the modulator 95. Thus, by operating the push-to-talk switch 60, the operator at the relay station can interrupt the conversation between the remote units and he may also communicate directly with these remote uuits. The push-to-talk switch 60 in the relay station may be replaced with a voice-operated switch similar to those employed in the portable units 55 if the situation requires that the relay station operator have his hands free for other functions. The autio compressor 94 functions in the same manner as the compressor 84 described above to compress and expand the audio signals applied thereto either from the microphone 62 or from the automatic noise limiting squelch circuit 92 in order to provide a gain controlled output signal having very little amplitude variation despite relatively large variations in the applied audio input signal. Thus, the modulator 95 is capable of providing substantially constant high level modulation in the order of ninety percent. Power for the circuits at the relay station may be supplied either from conventional 117 volt A.C., if this is available at the control center, or from battery units. The circuits in the relay station equipment preferably include transistors for all of the reasons given above but it will be observed that most of the complicated and heavier parts of the system are located at the fixed relay station where space and weight are relatively unimportant.

Turning now to the location of and the construction of the stub antennas 54 connected to the cable 51, it should be observed that these antennas are distributed throughout the operating area to provide complete coverage. Thus, in any regions within the operating areas where there is relatively weak signal strength, additional antennas may be added so that coverage is obtained without increasing the power required from the transmitters 56 and 63. As was previously indicated, it is desirable to keep the power output from these transmitters as low as possible in order to minimize interference with other equipment operating in the missile launching area, to reduce the power required and to conserve the frequency spectrum. In this connection, it should be observed that the low power from the transmitters provides only relatively short range communication of one-half mile or less and, hence, by keeping the power output very low, it is possible that the same frequencies could be used in other systems which are operated in the same general vicinity but more than one-half mile away.

The length of the radiating stub 54 is relatively unimportant but in areas where the portable units have difficulty in receiving the relay station transmission, it may be desirable to tune the antennas somewhat closer to the operating frequency of the relay station transmitter. The antenna 54*a* shown in FIG. 2 for communicating with the surface station 47 should preferably be located relatively high and away from the shielding structure in the silo 11.

While a particular embodiment of the invention has been illustrated and described, it will be recognized that many modifications will readily occur to those skilled in this art and it is therefore contemplated by the appended claims to cover any such modifications as fall within the true spirit and scope of the invention.

What is claimed as new and desired to be secured by Letters Patent of the Untied States is:

1. A system for providing two-way communication between a plurality of areas at least some of which are electrically shielded from one another to prevent the direct transmission and reception of radio waves therebetween;

said system comprising a fixed relay station at a first of said areas;

a plurality of remote units respectively located in other areas;

said relay station comprising a transmitter for developing a first frequency signal, a receiver tuned to receive signals in a second frequency channel separated from said first frequency, and a modulator for modulating the output of said receiver upon said first frequency signal;

each of said remote units including a transmitter for radiating a second signal within said second frequency channel, a receiver tuned to receive said first frequency signal, and means for modulating the second signal with audio voice signals, whereby two-way communication may be attained between said remote units by transmission of signals from one unit to the receiver at the relay station where the voice signals are detected and modulated upon the first signal for reception at another remote unit;

means including a switch at the relay station for interrupting the modulation of said first signal by the output of the receiver at the relay station and for modulating the first signal with voice signals originating at the relay station to permit two-way communication between the relay station and each remote unit;

conductor means connected at one end to the relay station and extending at least partially into the electrically shielded areas;

and a plurality of combined receiving and emitting antennas electrically connected to said conductor means and respectively disposed within said electrically shielded areas so that each antenna picks up the transmission from the remote unit operating within its area and also transmits to that remote unit the signal developed by the transmitter at the relay station.

2. The apparatus defined by claim 1 wherein said antennas comprise relatively short stubs electrically connected to said conductor means and extending outwardly therefrom.

3. The apparatus defined by claim 1 wherein the conductor means comprises a coaxial cable having an outer shield grounded at the relay station.

4. The apparatus defined by claim 2 wherein the conductor means comprises a coaxial cable having an outer shield grounded at the relay station.

5. In a system for providing two-way communication between a plurality of spaced apart areas at least some of which are normally electrically shielded from one another to prevent the direct transmission and reception of radio waves therebetween;

said system comprising a fixed relay station at a first of said areas;

a plurality of mobile remote units respectively located in other areas remote from said first area;

said relay station comprising a transmitter for developing a first frequency A.C. signal, a receiver tuned to receive signals in a second frequency channel separated from said first frequency, and a modulator for modulating the output of said receiver upon said first frequency signal;

each of said remote units including a transmitter for radiating a second A.C. signal within said second frequency channel, a receiver tuned to receive said first frequency signal, and means for modulating the second signal with audio voice signals, whereby two-way communication may be attained between said remote units by transmission of signals from one unit to the receiver at the relay station where the voice signals are detected and modulated upon the first signal for reception at another remote unit;

conductor means connected at one end to the relay station and extending from said first area into each of the remote electrically shielded areas;

and a plurality of combined receiving and emitting antennas electrically connected to said conductor means and respectively disposed within said remote electrically shielded areas so that each antenna picks up the transmission from the remote unit operating within its area to supply the signals picked up through said conductor means to the relay station and also transmits to that remote unit the signal developed by the transmitter at the relay station, each of said antennas comprising at least one relatively short stub of such length that it is effective to transmit said first signal and to receive said second signal.

6. The apparatus defined by claim 5 wherein the conductor means comprises a coaxial cable having an outer shield grounded at the relay station.

7. In a system for providing two-way communication between a plurality of spaced apart areas at least some of which are normally electrically shielded from one another to prevent the direct transmission and reception of radio waves therebetween;

said system comprising a first station at a first of said areas;

a plurality of mobile remote units respectively located at others of said areas remote from said first area;

said first station comprising a transmitter for developing a first frequency A.C. signal, a receiver tuned to receive signals in a second frequency channel separated from said first frequency, and a modulator for modulating said first frequency signal with audio voice signals;

each of said remote units including a transmitter for radiating a second A.C. signal within said second frequency channel, a receiver tuned to receive said first frequency signal, and means for modulating the second signal with audio voice signals;

conductor means connected at one end to the first station and extending from said first area into each of the remote electrically shielded areas;

and a plurality of combined receiving and emitting antennas electrically connected to said conductor means and respectively disposed within said remote electrically shielded areas so that each antenna picks up the transmission from the remote unit operating within its area to supply the signals picked up through said conductor means to the relay station and also transmits to that remote unit the first signal from the first station, each of said antennas comprising at least one relatively short stub of such length that it is effective to transmit said first signal and to receive said second signal.

8. The apparatus defined by claim 7 wherein the conductor means comprises a coaxial cable having an outer shield grounded at the first station.

9. In a system for providing two-way communication between first and second spaced apart areas normally electrically shielded from one another to prevent the direct transmission and reception of radio waves therebetween;

said system comprising a first station at said first area;

a mobile remote unit located at said second area remote from said first area;

said first station comprising a transmitter for developing a first A.C. signal having a first frequency, a receiver tuned to receive signals in a second frequency channel separated from said first frequency, and a modulator for modulating said first signal with audio voice signals;

said remote unit including a transmitter for radiating a second A.C. signal within said second frequency channel, a receiver tuned to receive said first frequency signals, and means for modulating the second signal with audio voice signals;

conductor means connected at one end to the first station and extending from said first area into the second area;

and at least one combined receiving and emitting antenna electrically connected to said conductor means and disposed within said second area to pick up the transmission from the remote unit to supply the signals picked up through said conductor means to the first station and also to transmit to the remote unit the first signal from the first station said antenna comprising at least one relative short stub of such length that it is effective to transmit said first signal and to receive said second signal.

10. The apparatus defined by claim 9 wherein the conductor means comprises a coaxial cable having an outer shield grounded at the relay station.

11. A system for providing two-way communication between a plurality of areas at least some of which are electrically shielded from one another to prevent the direct transmission and reception of radio waves therebetween; said system comprising a fixed relay station at a first of said areas; a plurality of remote units respectively located in other areas; said relay station comprising a transmitter for developing a first frequency signal, a receiver tuned to receive signals in a second frequency channel separated from said first frequency, and a modulator for modulating the output of said receiver upon said first frequency signal; each of said remote units including a transmitter for radiating a second signal within said second frequency channel, a receiver tuned to receive said first frequency signal, and means for modulating the second signal with low frequency signals, whereby two-way communication may be attained between said remote units by transmission of signals from one unit to the receiver at the relay station where the latter low frequency signals are detected and modulated upon the first signal for reception at another remote unit; means including a switch at the relay station for interrupting the modulation of said first signal by the output of the receiver at the relay station and for modulating the first signal with low frequency signals present at the relay station to permit two-way communication between the relay station and each remote unit; conductor means connected at one end to the relay station and extending at least partially into the electrically shielded areas; and a plurality of combined receiving and emitting antennas electrically connected to said conductor means and respectively disposed within said electrically shielded areas so that each antenna picks up the transmission from the remote unit operating within its area and also transmits to that remote unit the signal developed by the transmitter at the relay station.

12. The apparatus defined by claim 11 wherein said antennas comprise relatively short stubs electrically connected to said conductor means and extending outwardly therefrom.

13. The apparatus defined by claim 11 wherein the conductor means comprises a coaxial cable having an outer shield grounded at the relay station.

14. A system for providing two-way communication between a plurality of areas at least some of which are electrically shielded from one another to prevent the direct transmission and reception of radio waves therebetween; said system comprising a fixed relay station at a first of said areas; a plurality of remote units respectively located in other areas; said relay station comprising a transmitter for developing a first frequency signal, a receiver tuned to receive signals in a second frequency channel separated from said first frequency, and a modulator for modulating the output of said receiver upon said first frequency signal; each of said remote units including a transmitter for radiating a second signal within said second frequency channel, a receiver tuned to receive said first frequency signal, and means for modulating the second signal with other signals, whereby two-way communication may be attained between said remote units by transmission of signals from one unit to the receiver at the relay station where said other signals are detected and modulated upon the first signal for reception at another remote unit; means including a manually operated switch at the relay station for interrupting the modulation of said first signal by the output of the receiver at the relay station and for modulating the first signal with additional signals to permit two-way communication between the relay station and each remote unit; conductor means connected at one end to the relay station and extending at least partially into the electrically shielded areas; and a plurality of combined receiving and emitting antennas electrically connected to said conductor means and respectively disposed within said electrically shielded areas so that each antenna picks up the transmission from the remote unit operating within its area and also transmits to that remote unit the signal developed by the transmitter at the relay station.

15. The apparatus defined by claim 14 wherein said antennas comprise relatively short stubs electrically connected to said conductor means and extending outwardly therefrom.

16. The apparatus defined by claim 14 wherein the conductor means comprises a coaxial cable having an outer shield grounded at the relay station.

References Cited by the Examiner

UNITED STATES PATENTS

| | | | |
|---|---|---|---|
| 1,470,430 | 10/23 | Ellison | 325—28 |
| 2,419,833 | 4/47 | Grimes | 325—308 XR |
| 2,559,613 | 7/51 | Halstead | 325—308 XR |
| 2,642,524 | 6/53 | Bayliss | 325—53 |
| 2,866,088 | 12/58 | Young | 325—57 |

DAVID G. REDINBAUGH, *Primary Examiner.*